US012452105B2

(12) United States Patent
Weghaus et al.

(10) Patent No.: US 12,452,105 B2
(45) Date of Patent: Oct. 21, 2025

(54) METHOD FOR DETECTING A CHANGE IN A COMMUNICATIONS CHANNEL SYSTEM OF A VEHICLE, RF MODULE, RADIO SYSTEM AND VEHICLE WITH RADIO SYSTEM

(71) Applicant: HELLA GmbH & Co. KGaA, Lippstadt (DE)

(72) Inventors: Ludger Weghaus, Lippstadt (DE); Roman Curkin, Lippstadt (DE); Joachim Olk, Lippstadt (DE); Oliver Kirsch, Wuppertal (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 25 days.

(21) Appl. No.: 18/432,972

(22) Filed: Feb. 5, 2024

(65) Prior Publication Data

US 2024/0179030 A1   May 30, 2024

Related U.S. Application Data

(63) Continuation of application No. PCT/EP2021/081917, filed on Nov. 17, 2021.

(30) Foreign Application Priority Data

Aug. 3, 2021  (DE) .................... 10 2021 120 147.0

(51) Int. Cl.
    *H04L 25/02*      (2006.01)
(52) U.S. Cl.
    CPC ...... *H04L 25/0222* (2013.01); *H04L 25/0212* (2013.01)

(58) Field of Classification Search
    CPC ..................... H04L 25/0212; H04L 25/0222
    See application file for complete search history.

(56) References Cited

U.S. PATENT DOCUMENTS

| 6,427,122 B1 * | 7/2002 | Lin ........................ G01S 19/44 701/472 |
| 10,411,914 B2 * | 9/2019 | Gudovskiy ......... H04L 27/2695 |
| 11,601,306 B2 * | 3/2023 | Ernström ............ H04L 25/0224 |
| 2024/0241238 A1 * | 7/2024 | Sumi ................... G01S 15/8915 |

FOREIGN PATENT DOCUMENTS

WO   WO2016011433 A2   1/2016

OTHER PUBLICATIONS

International Search Report dated Apr. 20, 2022 in corresponding application PCT/EP2021081917.

* cited by examiner

*Primary Examiner* — Dac V Ha
(74) *Attorney, Agent, or Firm* — Muncy, Geissler, Olds & Lowe, P.C.

(57) ABSTRACT

A method for detecting a change in a transmission channel system of a vehicle. The method includes: transmitting a broadband transmission signal; receiving a signal; determining in-phase data and quadrature-phase data of a channel pulse response of the transmission channel system; determining a respective actual phase angle of the plurality of channel pulse responses at a characteristic location; determining a respective phase rotation angle of the plurality of channel pulse responses; rotating the plurality of channel pulse responses in a limited viewing area of a delay time direction; and detecting the change in the transmission channel system based on a change in the in-phase data and/or the quadrature-phase data.

13 Claims, 7 Drawing Sheets

METHOD FOR DETECTING A CHANGE IN A COMMUNICATIONS CHANNEL SYSTEM OF A VEHICLE, RF MODULE, RADIO SYSTEM AND VEHICLE WITH RADIO SYSTEM

This nonprovisional application is a continuation of International Application No. PCT/EP2021/081917, which was filed on Nov. 17, 2021, and which claims priority to German Patent Application No. 10 2021 120 147.0, which was filed in Germany on Aug. 3, 2021, and which are both herein incorporated by reference.

BACKGROUND OF THE INVENTION

Field of the Invention

The present invention relates to a method for detecting a change in a transmission channel system of a vehicle, a radio module, a radio system and a vehicle with a radio system.

Description of the Background Art

Ultra-wideband (UWB) is a radio technique in which a low-power transmission signal is transmitted over a wide range of frequencies so that occupied frequency bands are essentially undisturbed. For this purpose, the transmission signal can comprise at least one frame with individual pulses. Depending on the modulation method used, the amplitude, polarity and position of the individual pulses can be changed.

In a vehicle, e.g., in an automobile, a transmitter unit for transmitting a transmission signal and a receiver unit for receiving a receive signal based on the transmission signal may be arranged, wherein a transmission channel for transmitting the transmitting signal is determined by the environment. A change in the environment can change the transmission channel, wherein a change in the transmission channel can be done by detecting a change in the channel pulse response of the transmission channel in time. A change in the transmission channel can, for example, be caused by a person entering the vehicle or by altering a characteristic signal pattern, such as a breathing movement of a passenger of the vehicle. However, the detection of a ("real") change in the transmission channel, e.g., caused by a physical change in the vehicle, is a challenge, as technical components such as the transmitter unit and/or a radio module with a receiver unit may have technical tolerances or inaccuracies. These technical tolerances or inaccuracies can lead to the disadvantage that the detection unit for detecting the change in the transmission channel system does not detect a "real" change in the transmission channel, but rather an "apparent" change in the transmission channel caused by technical tolerances or inaccuracies, or that a "real" change in the transmission channel cannot be detected.

By means of an I&Q method (in-phase & quadrature-phase procedure), a phase information of the receive signal can be obtained in the event of a demodulation of a receive signal. On the one hand, the receive signal can be demodulated with the original phase position (in phase) and on the other hand, the receive signal can be demodulated with a reference frequency shifted by 90° (quadrature phase). This allows for the useful signal to be available as in-phase data and quadrature-phase data.

In addition, the transmitter unit can have a transmitter crystal oscillator for generating a periodic transmitter clock signal for transmitting a transmit signal, and the receiver unit can have a receiver crystal oscillator for generating a periodic receiver clock signal for restoring a receive signal based on the transmit signal. The frequencies of the transmitter clock signal and those of the receiver clock signal generally differ from each other.

When using a coherent receiver, the in-phase data and the quadrature-phase data can be phase-stable for a (single) frame of a receive signal. For the phase stability of the in-phase data and the quadrature-phase data of a single frame, e.g., a frequency deviation between the transmitter clock and the receiver clock is sensed and based on this, the frequency deviation is compensated for the in-phase data and the quadrature-phase data of the individual frame. Sensing the frequency deviation for a (single) frame is advantageously done at the beginning of a frame, wherein the parameters, in particular the frequency deviation or the frequency offset, can be set as constant for the time course of the (individual) frame. Thus, in-phase data and quadrature-phase data of a single frame can be phase-stable.

In the case of multiple transmissions of a respective transmission signal with a (single) frame in order to be able to detect a change in a transmission channel, and of a respective receive signal based on the transmission signal, the frequency deviation between the transmitter clock and the receiver clock is sensed for a respective (single) frame and based on this, the frequency deviation is compensated for the respective frame. Although the in-phase data and the quadrature-phase data can be phase-stable for each individual frame, but disadvantageously there is no phase stability between the respective in-phase data and the quadrature-phase data of the multiple frames, as a respective reference adjustment is different for the multiple frames. An (unintentionally) occurring high dynamic component of the respective in-phase components and the quadrature-phase components of the multiple transmission signals with a respective frame can thus make it difficult, in particular make it impossible, to detect a change, especially a "real" change, of a transmission channel.

SUMMARY OF THE INVENTION

It is therefore an object of the present invention to at least partially remedy the disadvantages described above. In particular, the object of the present invention is to demonstrate a particularly simple and/or accurate and/or reliable detection of a ("real") change in a transmission channel system or at least a transmission channel of a transmission channel system. Furthermore, it is in particular the object of the present invention to present a particularly simple and/or inexpensive and/or compact radio module or radio system for detecting a ("real") change in a transmission channel system.

The above object is achieved by a method, a radio module, a radio system, and a vehicle according to the invention. Features and details that are described in connection with the method according to the invention are of course also valid in connection with the radio module according to the invention and/or the radio system according to the invention and/or the vehicle according to the invention and vice versa in each case, so that with regard to the disclosure of the individual aspects of the invention there is or can always be reciprocal reference.

According to an example, the present invention shows a method for detecting a change in a transmission channel system of a vehicle with at least one transmission channel. The method has as one step a transmission of a broadband transmission signal, in particular an ultra-wideband transmission signal, by means of a transmitter unit via the transmission channel system and as a further step a reception of at least one receive signal based on the broadband transmission signal, in particular an ultra-wideband transmission signal, by means of a receiver unit. Furthermore, the method includes as one step a determination of in-phase data and quadrature-phase data, wherein in particular the in-phase data and quadrature-phase data are phase-stable, of a channel pulse response of the at least one transmission channel based on the receive signal by means of a detection unit. The above steps are repeated multiple times, in particular many times, in order to determine the respective in-phase data and quadrature-phase data, in particular phase-stable in-phase data and quadrature-phase data, of at least a plurality of channel pulse responses of the at least one transmission channel. Furthermore, as a step, the method has a determination of a respective actual phase angle of the plurality of channel pulse responses in at least one characteristic location, in particular in a single characteristic location, of the plurality of channel pulse responses based on the determined in-phase data and quadrature-phase data, in particular based on the determined, phase-stable in-phase data and quadrature-phase data, of the respective channel pulse response of the plurality of channel pulse responses by means of a phase angle unit. Furthermore, as a step, the method includes a determination of a respective phase rotation angle of the plurality of channel pulse responses from the respective (determined) actual phase angle of the plurality of channel pulse responses and a fixed, definable target phase angle of the plurality of channel pulse responses by means of the phase angle unit. In addition, the method, as a step, includes a respective rotation of the plurality of channel pulse responses with the determined in-phase data and quadrature-phase data at least in a limited viewing area of a delay time direction of the plurality of channel pulse responses by a respective determined phase rotation angle by means of a rotary unit. Furthermore, the method includes as a step a detection of the change in the transmission channel system, in particular the at least one transmission channel of the transmission channel system, in a detection time direction based on a change in the in-phase data and/or on a change in the quadrature-phase data of the plurality of channel pulse responses rotated in each case at least within the limited viewing area of the delay time direction of the plurality of channel pulse responses in the detection time direction by means of a detection unit.

The steps described above and below may be carried out individually, together, once, several times, in parallel and/or one after the other in any order, provided this makes technical sense.

The vehicle is, can be, a motor vehicle, preferably a passenger car or a truck.

In particular, the change in the transmission channel system is to be understood as a change in the transmission channel system over the detection time direction. In particular, the detection time direction is to be understood as a time direction for detecting the change in the transmission channel system or a transmission channel of the transmission channel system, wherein several channel pulse responses or respective in-phase data and quadrature-phase data of at least a plurality of channel pulse responses of the at least one transmission channel are determined, especially in the detection time direction. A change in the transmission channel system is, in particular, a detection of a change in at least one transmission channel of the transmission channel system. Detecting a change in the transmission channel system can also be understood as detecting the change in at least one transmission channel. If the transmission channel system has several transmission channels, it is also conceivable that there is a change in the transmission channel system, in particular if a change in the respective transmission channel has been detected for several transmission channels, preferably for all transmission channels. Thus, detecting a change in the transmission channel system can be particularly reliable.

In particular, the at least one or more transmission channels can be formed by the vehicle as well as by other objects, such as objects or people, in and/or around and/or on the vehicle. Thus, the method according to the invention can be for detecting a change in a transmission channel system, in particular at least one transmission channel of the transmission channel system, in and/or on the vehicle.

Detecting the change in the vehicle's transmission channel system is particularly important for monitoring the vehicle. In other words, detecting the change in the vehicle's transmission channel system can be used to monitor the vehicle. A method according to the invention for detecting the change in the transmission channel system of the vehicle with at least one transmission channel for monitoring the vehicle can have a closing, in particular locking, of the vehicle as an additional (activation) step. The monitoring of the vehicle is preferably an interior and/or exterior monitoring of the vehicle. For example, theft protection can be guaranteed through surveillance, especially indoor surveillance. Furthermore, the monitoring of the vehicle can also be used to detect the occupancy of at least one or more seats of the vehicle. A method according to the invention for detecting the change in the transmission channel system of the vehicle with the at least one transmission channel for detecting the occupancy of at least one seat can have, e.g., an unlocking of the vehicle and/or a starting of a drive unit to move the vehicle as an additional (activation) step.

Furthermore, the detection of a change in a transmission channel system of a vehicle can be or be used, in particular, to identify a characteristic signal pattern and/or to detect a change in a characteristic signal pattern. For example, a characteristic breathing movement of a living being, especially a child, can generate a characteristic signal pattern, so that a living being or several living beings, in particular a child or several children, (Child Presence Detection) can be detected in the vehicle in a particularly advantageous way with the method according to the invention, preferably by means of a change in a phase angle of the plurality of channel pulse responses rotated in each case.

It is also conceivable that the transmission channel system has several transmission channels. Thus, an area of a vehicle that is hidden for one transmitter unit—receiver unit combination can be made visible by means of another transmitter unit—receiver unit combination. For example, a vehicle can have several transmitter units and a receiver unit, or the vehicle may include one transmitter unit and several receiver units to form multiple transmission channels. In particular, the vehicle can also have multiple transmitter units and multiple receiver units to form multiple transmission channels. Thus, detecting a change in the transmission channel system can be particularly reliable.

The broadband transmission signal or the multiple broadband transmission signals may each comprise at least one frame, in particular only one (single) frame. In particular, a frame has multiple individual pulses.

Furthermore, for transmitting the broadband transmission signal, the transmitter unit can have its (own) transmitter clock signal generator, e.g., a transmitter crystal oscillator, for generating a periodic transmitter clock signal and the receiver unit can have its (own) receiver clock signal generator, e.g., a receiver crystal oscillator, for restoring the receive signal based on the broadband transmission signal for generating a periodic receiver clock signal. The transmitter clock signal generator can, e.g., have a frequency between 4 and 8 GHZ, in particular 8 GHz. The receiver clock signal generator can also, e.g., have a frequency between 4 and 8 GHZ, in particular 8 GHZ. Preferably, the transmitter clock signal generator and the receiver clock signal generator have the same frequency or substantially the same frequency.

The term "based" in "determination of in-phase data and quadrature-phase data of at least one channel pulse response of the at least one transmission channel of the vehicle based on the receive signal by means of a detection unit" can be intended to express in particular that the receive signal received by the receiver unit for the determination of in-phase data and quadrature-phase data of a channel pulse response can be further processed in at least one further step or several steps, such as demodulated and/or filtered and/or converted from an analog signal to a digital signal and/or correlated with another signal.

In particular, for the determination of the in-phase data and quadrature-phase data of a channel pulse response, the receive signal is demodulated with the original phase position on the one hand (in phase) and additionally filtered, preferably by means of a low- or band-pass, and furthermore, the receive signal based on the (respective) broadband transmission signal can be demodulated with a reference frequency phase-shifted by 90° (quadrature-phase) and additionally filtered, in particular by means of a low-pass or band-pass.

In addition, for the purpose of determining the in-phase data and the quadrature-phase data of a channel pulse response of a transmission channel (based on the receive signal), the receive signal can be correlated with the (original) broadband transmission signal, in particular cross-correlated by means of a correlation unit, wherein this takes place in particular after demodulating the receive signal and/or filtering the receive signal and/or converting the receive signal to a digital signal. For example, the broadband transmission signal for correlation, in particular cross-correlation, can be stored in a memory of a radio module or radio system according to the invention for the determination of the in-phase data and the quadrature-phase data of the channel pulse response. Advantageously, the determination of the in-phase data and the quadrature-phase data of the channel pulse response of the transmission channel based on the receive signal can be made particularly easy. Advantageously, a cross-correlation function obtained by cross-correlating the receive signal with the broadband transmission signal can represent the channel pulse response of the transmission channel. Furthermore, the in-phase data and the quadrature-phase data of the channel pulse response are in particular a function of the delay time direction. On the basis of the in-phase data and the quadrature-phase data of the channel pulse response, a possible multipath propagation of the broadband transmission signal can be detected, wherein the detection of a possible multipath propagation depends in particular on a delay measurement time, i.e., in particular how long the receive signal is measured. Furthermore, each of the channel pulse responses of the plurality of channel pulse responses may each be represented by a set of value pairs of in-phase data and quadrature-phase data.

Furthermore, the determined in-phase data and quadrature-phase data of a channel pulse response are in particular phase-stable in-phase data and of quadrature-phase data of the channel pulse response. In order to determine phase-stable in-phase data and quadrature-phase data of a channel pulse response of at least one transmission channel based on the receive signal, a frequency deviation between the transmitter clock signal generator and the receiver clock signal generator is sensed by means of a sensor unit of the radio system. By means of a phase compensation unit of the radio system, a phase instability of the in-phase data and the quadrature-phase data can be compensated or substantially compensated based on the sensed frequency deviation. Advantageously, the phase-stable in-phase data and quadrature-phase data of the channel pulse response can be accumulated by means of an accumulator unit of the radio system. Due to accumulation, a signal strength can be particularly advantageous, so that the respective information content of the plurality of channel pulse responses can also be particularly advantageous.

In particular, a phase angle based on in-phase data and quadrature-phase data, e.g., an actual phase angle of a channel pulse response can be determined as follows:

$$\varphi = \arctan\frac{Q}{I}$$

In particular, the phase angle based on in-phase data and quadrature-phase data is determined for a determinable point in time in a delay time direction of the channel pulse response. The term "delay time direction" can refer in particular to a time direction for receiving a (single) receive signal based on the broadband transmission signal, taking into account in particular multipath propagation or reflections. In particular, the length of time for which a receive signal based on the broadband transmission signal is received or measured, in particular by the receiver unit, can be determined or defined. In particular, the phase angle unit can have a computational unit for determining a respective actual phase angle.

In particular, a pair of values of the in-phase data and quadrature-phase data (of a channel pulse response) can be used to represent a (rotating) pointer in a complex plane, wherein the pointer has a phase angle.

In particular, by rotating the plurality of channel pulse responses with the determined in-phase data and quadrature-phase data, at least within a limited viewing area of a delay time direction of the plurality of channel pulse responses by the respective determined phase rotation angle, a dynamic component between the plurality of channel pulse responses, preferably a dynamic component between the plurality of determined in-phase responses of the plurality of channel pulse responses and/or a dynamic component between the plurality of quadrature-phase data of the plurality of channel pulse responses can be kept to a minimum, in particular reduced.

In particular, the respective rotation of the plurality of channel pulse responses with the determined in-phase data and quadrature-phase data, preferably at least in the limited viewing area of the delay time direction of the plurality of channel pulse responses, by the respective determined phase rotation angle, is such a (respective) rotation that the respective channel pulse responses with the determined in-phase data and quadrature-phase data are rotated at least within the limited viewing area of the delay time direction of the plurality of channel pulse responses by the same (respective) determined phase rotation angle.

In other words, in particular, each of the channel pulse responses of the plurality of channel pulse responses can be represented by a set of value pairs of in-phase data and quadrature-phase data, wherein at least the pairs of values of the set of value pairs of in-phase data and quadrature-phase data of the respective channel pulse response, preferably in the limited viewing area of the delay time direction of the plurality of channel pulse responses, are rotated by the same (respective) phase rotation angle. A (single) pair of values of in-phase data and quadrature-phase data includes in particular an in-phase value, a quadrature-phase value, and a delay time (in the delay time direction).

For example, the actual phase angle of a pair of values of in-phase data and quadrature-phase data of a channel pulse response at the characteristic location of the plurality of channel pulse responses can be 40° and the fixed, definable target phase angle at the characteristic location can be 0° (for all channel pulse responses). Very preferably, the pairs of values of in-phase data and quadrature-phase data of the channel pulse response, which are within the limited viewing area of the plurality of channel pulse responses, are rotated by −40° (minus)40°, regardless of their respective actual phase angle. In other words, in this example, the channel pulse response is rotated by −40° (minus 40°) by a phase rotation angle with the determined in-phase data and quadrature-phase data in the limited viewing area. In the case of another, different channel pulse response of the plurality of channel pulse responses, the actual phase angle of a pair of values of in-phase data and quadrature-phase data at (the same) characteristic location of the plurality of channel pulse responses can be 74° (and the fixed, definable target phase angle at the characteristic location can be 0° (for all channel pulse responses)). Very preferably, the value pairs of in-phase data and quadrature-phase data of the other, different channel pulse response, which are located in the limited viewing area of the plurality of channel pulse responses, are therefore rotated by −74° (minus 74°) in each case, regardless of their respective actual phase angle. An (unintentionally) occurring high dynamic component of the respective in-phase data and the quadrature-phase data of the two channel pulse responses can thus be kept particularly low and a detection of a "real" change in a transmission channel can be made possible.

In particular, the rotary unit can have a computing unit for rotating in each case the plurality of channel pulse responses with the determined in-phase data and quadrature-phase data by a respective phase rotation angle. In other words, the rotary unit can have a computing unit for calculating the rotated channel pulse responses with the rotated in-phase data and quadrature-phase data.

In particular, the fixed, definable target phase angle at the characteristic location of the plurality of channel pulse responses is the same for the plurality of channel pulse responses. For example, for all channel pulse responses, the fixed, definable target phase angle at the characteristic location can be 0°.

The at least one limited viewing area of the delay time direction is in particular a limited time range of the delay time direction, in which the change in the transmission channel system or a transmission channel of the transmission channel system is to be detected. In particular, the limited viewing area can be understood as a part of the delay measurement time. Furthermore, the limited range, in particular the limited viewing area, can be understood as a closed time range in the delay time direction of the plurality of channel pulse responses. Advantageously, only a rotation of the plurality of channel pulse responses with the determined in-phase data and quadrature-phase data in the limited viewing area of the delay time direction of the plurality of channel pulse responses by the respective determined phase rotation angle is necessary, so that this can be done particularly quickly and with very little effort.

Furthermore, the at least one limited viewing area of the delay time direction of the plurality of channel pulse responses can depend on the use case and/or the arrangement of the transmitter unit and the receiver unit. It is conceivable that for certain use cases, several limited viewing areas are of interest for detecting a change in the transmission channel system.

In particular, the respective rotation of the plurality of channel pulse responses with the determined in-phase data and quadrature-phase data can only take place in the (one) limited viewing area of a delay time direction of the plurality of channel pulse responses by the respective determined phase rotation angle. However, it is also conceivable that the respective rotation of the plurality of channel pulse responses with the determined in-phase data and quadrature-phase data by the respective determined phase rotation angle by means of the rotary unit is carried out in such a way that in each case the complete channel pulse response of the plurality of channel pulse responses with the respective determined in-phase data and quadrature-phase data is rotated by the respective determined phase rotation angle.

Furthermore, based in particular on the determined in-phase data and quadrature-phase data of a channel pulse response, or based on the respective determined in-phase data and quadrature-phase data of a plurality of channel pulse responses, the at least one characteristic location of the plurality of channel pulse responses can be determined by means of a position determination unit. Furthermore, it is conceivable that the characteristic location of the plurality of channel pulse responses can be changed via the detection time direction. In other words, the characteristic location of the plurality of channel pulse responses can be redetermined at least once via the detection time direction, in particular it can be redetermined several times, e.g., with a computing unit. Thus, changes, in particular ongoing changes, in the transmission channel system or a transmission channel of the transmission channel system can be taken into account.

In particular, the characteristic location of the plurality of channel pulse responses is a location of the plurality of channel pulse responses of the delay time direction, where the in-phase data and/or the quadrature-phase data and/or an amount value of the respective channel pulse responses of the plurality of channel pulse responses obtained from the in-phase data and/or the quadrature-phase data have a particularly high information content. In particular, an amount value for an in-phase data and quadrature-phase data value pair is calculated as follows: $Z=\sqrt{I^2+Q^2}$. For example, the characteristic location of the plurality of channel pulse responses can represent the "line of sight" of a transmission channel of the transmission channel system. In addition, an information-rich area of the transmission channel of the transmission channel system representing the "line of sight" may constitute a characteristic viewing area.

In particular, the characteristic location defines a delay time of the delay time direction for the plurality of channel pulse responses, in particular a respective delay time of the delay time direction for the plurality of channel pulse responses, in order to detect the change in the transmission channel system in the detection time direction. In particular, the characteristic location cannot lie within the at least one limited viewing area in which the change in the transmission channel system in the direction of detection is to be detected.

By rotating the plurality of channel pulse responses with the determined in-phase data and quadrature-phase data at least within the limited viewing area of the delay time direction of the plurality of channel pulse responses by the respective determined phase rotation angle, phase stability can also be advantageously improved, in particular created, between the channel pulse responses (with the respective "rotated" in-phase data and quadrature-phase data), at least in the limited viewing area. Thus, an (unintentionally) occurring high dynamic component of the plurality of channel pulse responses with the respective in-phase data and the quadrature-phase data caused by technical tolerances or inaccuracies can be kept particularly advantageously low, preferably eliminated. For example, a crystal oscillator as a transmitter clock signal generator and another crystal oscillator as a receiver clock signal generator can each be subject to certain tolerances and cause a dynamic component due to a frequency deviation. The transmitter clock signal generator can, e.g., have a tolerance of 1 to 100 ppm, preferably from 1 to 30 ppm, very preferably from 5 to 10 ppm. The receiver clock signal generator can also, e.g., have a tolerance of 1 to 100 ppm, preferably from 1 to 30 ppm, very preferably from 5 to 10 ppm. By rotating the plurality of channel pulse responses with the determined in-phase data and quadrature-phase data by a respective phase rotation angle according to the invention, the transmitter clock signal generator and the receiver clock signal generator can be artificially adjusted extremely finely. Thus, an artificial coherent radio system can be provided. Consequently, it is particularly easy, accurate and reliable to detect a change, in particular a "real" change, in a transmission channel system or at least a transmission channel of the transmission channel system.

The expression "change in the transmission channel system", "change in the transmission channel", "detection of a change in the transmission channel system", "detection of a change in the transmission channel" or the like can generally be assumed to mean that a "real" change is meant or that the expression refers to a "real" change. If helpful for purposes of comprehension or emphasis, the word "really" or "apparently" is sometimes added.

Furthermore, it may be advantageous if, in a method according to the invention, the respective phase rotation angle of the plurality of channel pulse responses is determined as the negative difference or essentially the negative difference from the respective actual phase angle of the plurality of channel pulse responses and the fixed, definable target phase angle. In particular, the respective phase rotation angle of the plurality of channel pulse responses is the negative difference or essentially the negative difference between the respective actual phase angle of the plurality of channel pulse responses and the fixed, definable target phase angle. As a result, the dynamic component between the channel pulse responses, in particular the dynamic component of the in-phase data and/or the dynamic component of the quadrature-phase data, can be kept particularly low, at least in the limited viewing area. Thus, the detection of a ("real") change in a transmission channel system or at least a transmission channel of a transmission channel system can be particularly accurate and reliable.

Advantageously, in a method according to the invention, the change in the transmission channel system in the detection time direction can be detected at least by determining a change in a phase angle of the plurality of channel pulse responses rotated in each case, at least in the limited viewing area of the delay time direction of the plurality of channel pulse responses, wherein the phase angle based on the in-phase data and the quadrature-phase data of the plurality of channel pulse responses rotated in each case is determined, in particular calculated. This means that even very minor changes, e.g., a change caused by a child's breathing movement, in a transmission channel system or at least a transmission channel of a transmission channel system can be detected particularly accurately within the limited viewing area. The detection of the change in the phase angle takes place in particular in the detection time direction. For example, with a center frequency of the broadband transmission signal of 8 GHZ, wherein a receiver clock signal generator is advantageously set to 8 GHZ, a wavelength of an electromagnetic wave is 3.75 cm and a change in the path of the electromagnetic wave by, e.g., $\lambda/8$, i.e., about 0.5 cm, results in a change in phase from $360°/8=45°$.

Advantageously, this can make a significant difference in the in-phase data and quadrature-phase data of a channel pulse response or in the phase angle determined based on the in-phase data and the quadrature-phase data. In particular, a respective phase angle can be determined for the respective value pairs of in-phase data and quadrature-phase data in at least a limited viewing area of the plurality of channel pulse responses in order to detect the change in the transmission channel system in the detection time direction by determining the change in the phase angle. Furthermore, it is preferable to consider at least one delay time of the delay time direction of the plurality of channel pulse responses in order to detect a change in the phase angle in the detection time direction. It is also conceivable that multiple delay times of the delay time direction of the plurality of channel pulse responses are considered in order to detect a change in the phase angle in the detection time direction. Thus, e.g., multiple changes in the transmission channel can be detected.

With a particular advantage, the change in the transmission channel system in the detection time direction can be detected in a method according to the invention at least by determining a change in an amplitude of the in-phase data of the plurality of channel pulse responses rotated in each case at least in the limited viewing area of the delay time direction of the plurality of channel pulse responses and/or that the change in the transmission channel system in the detection time direction is detected at least by determining a change in an amplitude of the quadrature-phase data of the plurality of channel pulse responses rotated in each case at least within the limited viewing area of the delay time direction of the plurality of channel pulse responses. Thus, the detection of a change in the transmission channel system can be done particularly quickly, since there is no need to determine, especially calculate, a change in a phase angle to determine a change in the transmission channel system. Furthermore, preferably at least one delay time of the delay time direction of the plurality of channel pulse responses can be considered in order to detect a change in the amplitude of the in-phase data and/or to detect a change in the amplitude of the quadrature-phase data in the detection time direction. It is also conceivable that multiple delay times of the delay time direction of the plurality of channel pulse responses are considered in order to detect a change in the amplitude of the in-phase data and/or to detect a change in the amplitude of the quadrature-phase data in the detection time direction. Thus, several changes in the transmission channel can be detected.

According to an example, in a method according to the invention of detecting the change in the transmission channel system in the detection time direction, the plurality of channel pulse responses rotated in each case with the in-phase data and quadrature-phase data in the detection time direction can be filtered by means of a filter unit at least within the limited viewing area of the delay time direction of the plurality of channel pulse responses. This makes it particularly easy to detect a change in the at least one transmission channel. In particular, the filter unit can have a high-pass filter, so that an equal proportion of the rotated channel pulse responses for detecting the change in the transmission channel system in the detection time direction are advantageously filtered out. When detecting a change in the transmission channel system in the detection time direction by determining a change in a phase angle of the plurality of channel pulse responses rotated in each case, the high-pass filter can be used to filter out an equal proportion of the phase angles determined based on the in-phase data and the quadrature-phase data of the plurality of channel pulse responses rotated in each case, especially in the detection time direction. Furthermore, when detecting a change in the transmission channel system in the detection time direction, an equal proportion of the amplitude of the in-phase data and/or the amplitude of the quadrature-phase data, especially in the detection time direction, can be filtered out with the high pass filter by determining a change in an amplitude of the in-phase data and/or an amplitude of the quadrature-phase data of the plurality of channel pulse responses rotated in each case. Preferably, filtering in the detection time direction only takes place in the limited viewing area or only in several limited viewing areas. This means that a change in a transmission channel can be detected particularly quickly.

It may be advantageous if, in a method according to the invention, at least one characteristic location of the plurality of channel pulse responses is a location in a characteristic viewing area of the delay time direction by a respective first amplitude maximum in time of the plurality of channel pulse responses. An (unintentionally) occurring high dynamic component of the respective in-phase data and the quadrature-phase data of the two channel pulse responses can thus be kept particularly low and a detection of a "real" change in a transmission channel can be particularly advantageous. In particular, the characteristic location defines a delay time of the delay time direction for the plurality of channel pulse responses, wherein this point in time is decisive for detecting the change in the transmission channel system in the detection time direction. In particular, the first amplitude maximum in time represents the "line of sight" of a transmission channel of the transmission channel system. In particular, the "line of sight" represents the geometrically shortest line of sight between a transmission channel of the transmission channel system formed by a transmitter unit and a receiver unit. The "line of sight" can also be understood as the "first path" or the "shortest path". Advantageously, a channel pulse response for the "line of sight" or in a limited viewing area in the delay time direction around the "line of sight" can have a particularly high information content. This limited viewing area in the delay time direction around or around and with the "line of sight" can have a particularly high information content and can be understood as the characteristic viewing area. Detecting the change in the transmission channel system in the detection time direction can be done particularly reliably in the characteristic viewing area of the plurality of channel pulse responses. Preferably, the characteristic location of the plurality of channel pulse responses or the respective channel pulse response of the plurality of channel pulse responses is the first amplitude maximum in time, in particular in each case the "line of sight" of the plurality of channel pulse responses. This makes it particularly easy to determine, and in particular calculate, the characteristic location. It is also conceivable that in order to determine the at least one characteristic location of the plurality of channel pulse responses for the plurality of channel pulse responses, at least a first amplitude maximum in time of only one channel pulse response, preferably the first "received" channel pulse response, of the plurality of channel pulse responses is determined. Thus, the respective determination, especially calculation, of a first amplitude maximum in time can be omitted for the further channel pulse responses.

Advantageously, in a method according to the invention, the at least one characteristic location of the plurality of channel pulse responses can be a location in a characteristic viewing area of the delay time direction around a respective local amplitude maximum of the plurality of channel pulse responses. Thus, the detection of the change in the transmission channel system, e.g., can be successful even when the geometrically shortest line of sight between a transmitter unit and a receiver unit is blocked or can be blocked, and thus the channel pulse responses may not have or represent a "line of sight" for providing a characteristic location. In particular, it is conceivable that the respective local amplitude maximum of the plurality of channel pulse responses is not the respective absolute amplitude maximum of the plurality of channel pulse responses. The respective local amplitude maximum of the plurality of channel pulse responses can represent a reflection path in the transmission channel from the transmitter unit to the receiver unit. Advantageously, a channel pulse response can have a particularly high information content for the reflection path or in a limited viewing area in the delay time direction around the reflection path. This limited viewing area in the delay time direction around or with the reflection path can have a particularly high information content and can be understood as the characteristic viewing area. Detecting the change in the transmission channel system in the detection time direction can be carried out particularly reliably in this characteristic viewing area of the plurality of channel pulse responses. Very preferably, the characteristic location of the plurality of channel pulse responses or the respective channel pulse response of the plurality of channel pulse responses is the local amplitude maximum of the plurality of channel pulse responses. This makes it particularly easy to determine, and in particular calculate, the characteristic location. It is also conceivable that in order to determine the at least one characteristic location of the plurality of channel pulse responses for the plurality of channel pulse responses, at least one relative amplitude maximum of only one channel pulse response, preferably the first "received" channel pulse response, of the plurality of channel pulse responses is determined. Thus, the respective determination, especially calculation, of a respective relative amplitude maximum for the further channel pulse responses can be omitted.

With a particular advantage, in a method according to the invention, at least one characteristic location of the plurality of channel pulse responses, one location in a characteristic viewing area of the delay time direction can lie around a respective absolute amplitude maximum of the plurality of channel pulse responses. An (unintentionally) occurring high dynamic component of the respective in-phase data and the quadrature-phase data of the two channel pulse responses can thus be kept particularly low and a detection of a "real" change in a transmission channel can be particularly advantageous. Advantageously, the respective absolute amplitude maximum of the plurality of channel pulse responses can have a particularly high information content and can be particularly advantageous as a characteristic location. In particular, the absolute amplitude maximum can represent the "line of sight" of a transmission channel of the transmission channel system or a reflection path of a transmission channel of the transmission channel system. Detecting the change in the transmission channel system in the detection time direction can therefore be carried out particularly reliably.

According to an example, in a method according to the invention for detecting the change in the transmission channel system in the detection time direction, the plurality of channel pulse responses with the respective determined in-phase data and quadrature-phase data can be rotated by the respective determined phase rotation angle in several limited viewing areas of the delay time direction of the plurality of channel pulse responses. Thus, e.g., several changes in the transmission channel system in the detection time direction or one change in the transmission channel system in the detection time direction can be detected particularly reliably. In particular, the multiple limited viewing areas of the delay time direction are at least two limited viewing areas of the delay time direction. By looking at limited viewing areas, irrelevant areas of the channel pulse responses can be "hidden" in the delay time direction. In particular, a closed time range in the delay time direction of the plurality of channel pulse responses can be understood as a limited area, in particular as a limited viewing area.

According to an example, the present invention shows radio module for a radio system for detecting a change in a transmission channel system of a vehicle with at least one transmission channel. The radio module has at least one receiver unit for receiving at least one receive signal based on the broadband transmission signal, as well as at least one determining unit for determining in-phase data and quadrature-phase data of at least one channel pulse response of at least one transmission channel of the vehicle based on the receive signal. Furthermore, the radio module comprises at least one phase angle unit for determining an actual phase angle of the channel pulse response in at least one characteristic location of a plurality of channel pulse responses based on the determined in-phase data and quadrature-phase data of the channel pulse response of the plurality of channel pulse responses, as well as for determining a phase rotation angle of the channel pulse response from the actual phase angle of the channel pulse response and a fixed, definable target phase angle of the plurality of channel pulse responses. Furthermore, the radio module comprises at least one rotary unit for rotating the channel pulse response with the determined in-phase data and quadrature-phase data at least in a limited viewing area of a delay time direction of the plurality of channel pulse responses by the phase rotation angle. In addition, the radio module includes at least one detection unit for detecting the change in the transmission channel system in a detection time direction based on a change in the in-phase data and/or on a change in the quadrature-phase data of the plurality of channel pulse responses rotated in the detection time direction in each case at least within the limited viewing area of the delay time direction of the plurality of channel pulse responses.

In particular, the radio module can be used for monitoring the vehicle and/or for detecting the occupancy of at least one seat and/or for identifying a characteristic signal pattern, in particular for child presence detection.

In particular, the radio module with the receiver unit, the determining unit, the phase angle unit, the rotary unit and the detection unit forms a structural unit for the vehicle. Thus, e.g., monitoring of the vehicle can be carried out in a particularly simple and energy-saving manner, as, e.g., a vehicle control unit can be shut down or put into a sleep mode. In particular, a radio system according to the invention may include several such radio modules.

It is also conceivable that the radio module, as a structural unit, can have a filter unit and/or a sensor unit and/or a phase compensation unit and/or an accumulator unit and/or a correlation unit and/or a position determination unit in addition to the receiver unit, the determining unit, the phase angle unit, the rotary unit and the detection unit. Further, the receiver unit and/or the determining unit and/or the phase angle unit and/or the rotary unit and/or the detection unit and/or the filter unit and/or the sensor unit and/or the phase compensation unit and/or the accumulator unit and/or the correlation unit and/or the position determination unit may operate at least partially based on algorithms, in particular by means of a computer program. In particular, a radio system may have several such radio modules.

When a change in the transmission channel system is detected or a change in at least one transmission channel is detected, the detection unit, in particular of the radio module or the radio system, can send a control signal to a vehicle control unit in order to trigger a definable response. For example, an alarm can be triggered when the vehicle is monitored. It is also conceivable that a determinable reaction is only triggered when a plurality of changes in the at least one transmission channel are detected.

The radio module has the same advantages as have already been described for the method of the invention.

According to an example, the present invention shows a radio system for detecting a change in a transmission channel system of a vehicle with at least one transmission channel, wherein the radio system is designed to perform a method according to the invention.

In particular, the radio system may be used to monitor the vehicle and/or to detect the occupancy of at least one seat and/or to identify a characteristic signal pattern, in particular for child presence detection.

Preferably, the radio system according to the invention can have at least one transmitter unit and at least one receiver unit. However, it is also conceivable that the radio system has several transmitter units and/or several receiver units.

A radio system according to the invention can have at least one radio module designed according to the invention as well as at least one transmitter unit for transmitting a broadband transmission signal over a transmission channel system.

The radio system thus may have the same advantages as have already been described for the method of the invention or the radio module of the invention.

The present invention also shows a vehicle with a radio system designed according to the invention, wherein at least one transmitter unit of the radio system for transmitting a broadband transmission signal and at least one receiver unit of the radio system for receiving at least a receive signal based on the broadband transmission signal are arranged separately from each other on and/or in the vehicle, in particular in a fixed position, in such a way that the at least one transmitter unit and the at least one receiver unit have the geometrically shortest line of sight to each other.

In particular, the at least one transmitter unit may have a transmitting antenna and the at least one receiver unit may have a receiving antenna, wherein the transmitting antenna and the receiving antenna are arranged separately from each other, in particular in a fixed position, on and/or in the vehicle in such a way that the transmitting antenna and the receiving antenna have the geometrically shortest line of sight to each other. In particular, the transmitter unit and the at least one receiver unit may have the geometrically shortest line of sight to each other during the operation of the vehicle and/or when the vehicle is stationary. The expression "that the at least one transmitter unit and the at least one receiver unit have a geometrically shortest line of sight to each other" is intended to express that electromagnetic waves can propagate directly, i.e., by the geometrically shortest path, from the transmitter unit to the receiver unit. This allows for a "line of sight" to be generated in the channel pulse responses. In particular, the at least one transmitter unit and the at least one receiver unit are arranged separately from each other on and/or in the vehicle, in particular in a fixed position, in such a way that the probability that the geometrically shortest path between the transmitter unit and the receiver unit for the electromagnetic waves emitted by the transmitter unit, i.e., the broadband transmission signal, is not blocked or is not blocked by vehicle occupants or objects such as transportable items. For example, the at least one transmitter unit and the at least one receiver unit may each be located on and/or in a vehicle roof, in particular in an interior of the vehicle on and/or in a vehicle roof, of the vehicle. It is also conceivable that the at least one transmitter unit is disposed on and/or in an exterior body, e.g., an underbody and/or a bumper, and/or an exterior component and/or an interior component of the vehicle and/or that the at least one receiver unit is attached to and/or in an exterior body, e.g., an underbody and/or a bumper, and/or an exterior component and/or an interior component of the vehicle.

The vehicle thus has the same advantages as have already been described for the method according to the invention or the radio module according to the invention or the radio system according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
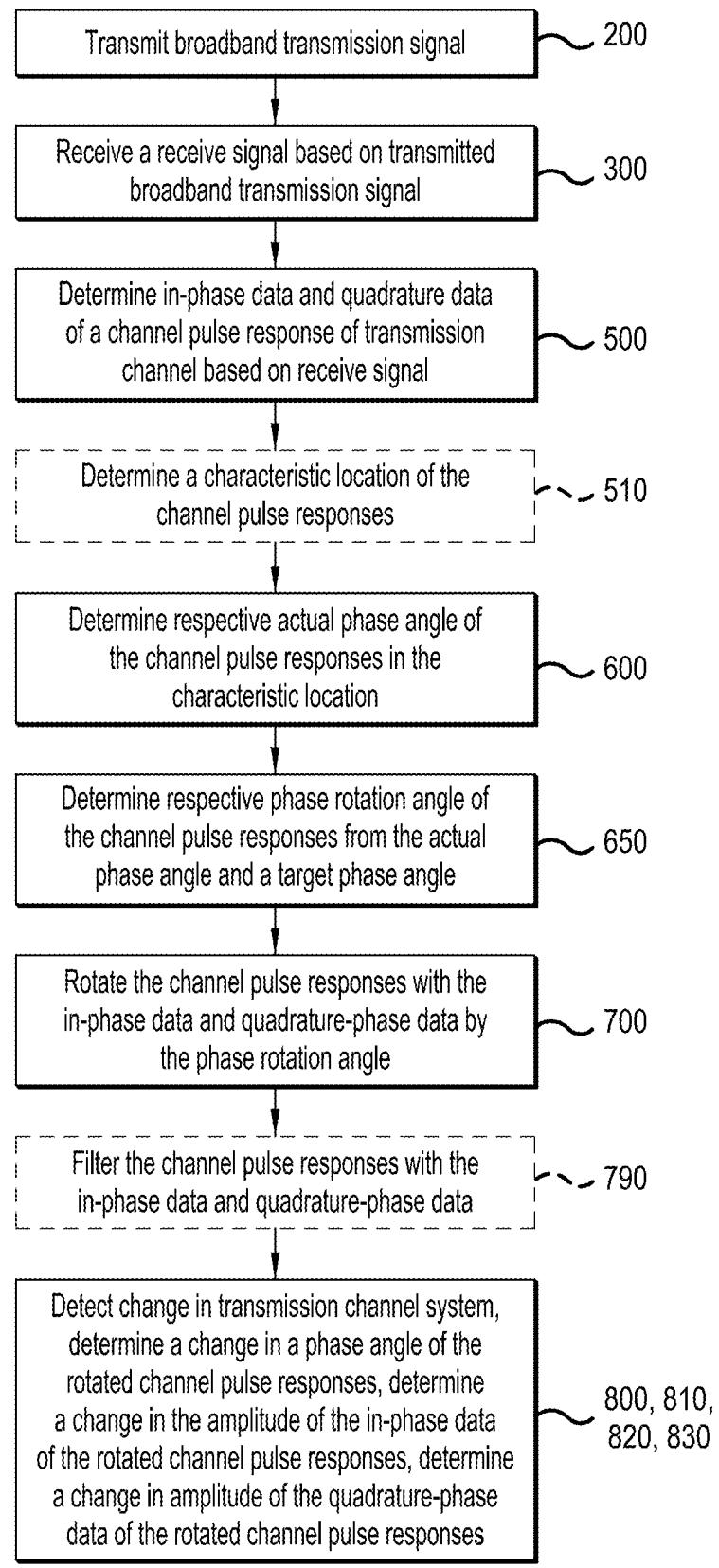
FIG. 1 shows a method for detecting a change in a vehicle's transmission channel system
Figure 8:
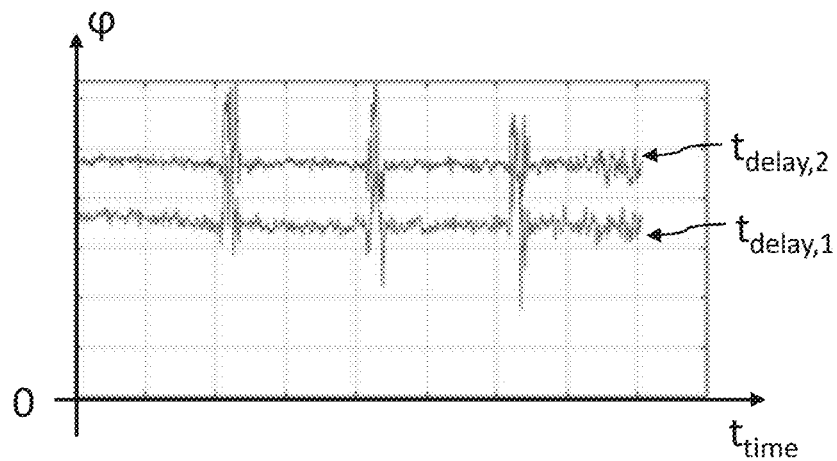
FIG. 8 shows a progression of a phase angle over the detection time direction.
Figure 9:
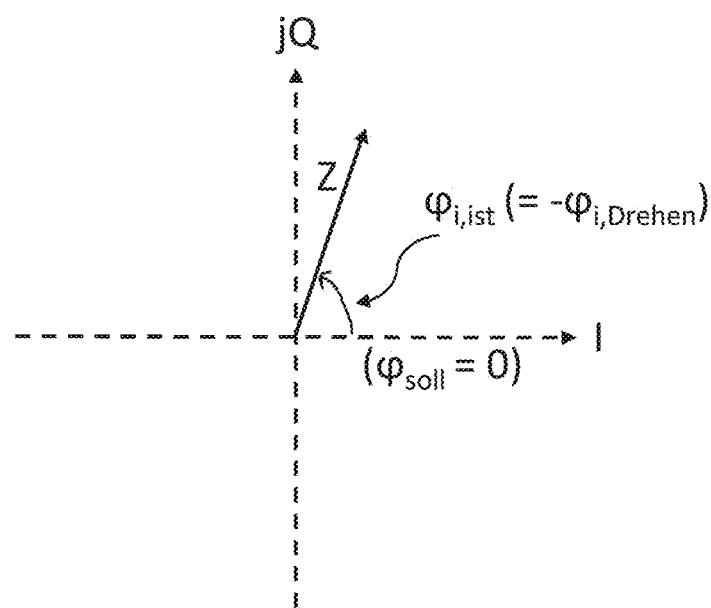
FIG. 9 shows pointers in a complex plane.

FIG. 1 reveals a method for detecting a change in a transmission channel system of a vehicle 100 (see, e.g., FIG. 4) with at least one transmission channel. The method has, as one step, a transmission 200 of a broadband transmission signal by means of a transmitter unit 20 over the transmission channel system, in particular the at least one transmission channel, of the vehicle 100. As a further step, the method includes receiving 300 at least one receive signal based on the broadband transmission signal by means of a receiver unit 30 and, as a further step, determining 500 in-phase data and quadrature-phase data of at least one channel pulse response of the at least one transmission channel based on the receive signal by means of an determining unit 50. Transmitting 200, receiving 300 and determining 500 are repeated several times for determining 500 respective in-phase data and quadrature-phase data of at least a plurality of channel pulse responses of the at least one transmission channel in a detection time direction $t_{time}$. As a further step, the method includes a determination 600 of a respective actual phase angle $\varphi_{i,ist}$ of the plurality of channel pulse responses in at least one characteristic location C1, C2 (see, e.g., FIG. 7) of the plurality of channel pulse responses based on the in-phase data and quadrature-phase data of the respective channel pulse response of the plurality of channel pulse responses determined by means of a phase angle unit 60. In addition, as a step 510, the method can have a determination of the at least one characteristic location C1, C2 of the plurality of channel pulse responses based on the determined in-phase data and quadrature-phase data of a channel pulse response, or based on the respective determined in-phase data and quadrature-phase data of the plurality of channel pulse responses by means of a position determination unit. The method also includes as a step a determination 650 of a respective phase rotation angle $\varphi_{i,Drehen}$ of the plurality of channel pulse responses from the respective actual phase angle $\varphi_{i,ist}$ of the plurality of channel pulse responses and a fixed, definable target phase angle $\varphi_{Soll}$ of the plurality of channel pulse responses (see, e.g., FIG. 8) by means of the phase angle unit 60. For better understanding, FIG. 9 shows in a complex plane (I, jQ) an example of a pointer with an in-phase value I (real part), a quadrature-phase value Q (imaginary part) and with an amount value Z. The pointer also includes an actual phase angle $\varphi_{i,ist}$. Quite advantageously, the respective phase rotation angle $\varphi_{i,Drehen}$ of the plurality of channel pulse responses is determined as the negative difference or essentially the negative difference from the respective actual phase angle $\varphi_{i,ist}$ of the plurality of channel pulse responses and the fixed, definable target phase angle $\varphi_{Soll}$, which is the same (identical) for all channel pulse responses, e.g., 0°. In addition, the method includes as a step a respective rotation 700 of the plurality of channel pulse responses with the determined in-phase data and quadrature-phase data at least in a limited viewing area of a delay time direction $t_{delay}$ of the plurality of channel pulse responses by the respective determined phase rotation angle $\varphi_{i,Drehen}$ by means of a rotary unit 70. The respective rotation 700 of the plurality of channel pulse responses with the determined in-phase data and quadrature-phase data means in particular a respective rotation of the respective pointers of the plurality of channel pulse responses resulting from the determined in-phase data and quadrature-phase data (at least in the limited viewing area of a delay time direction $t_{delay}$ of the plurality of channel pulse responses) by the respective determined phase rotation angle $\varphi_{i,Drehen}$. In FIG. 6, for example, the plurality of channel pulse responses with the determined in-phase data and quadrature-phase data from FIG. 5 have been rotated 700 by the respective determined phase rotation angle $\varphi_{i,Drehen}$ by means of the rotary unit 70 in each case "completely", i.e., over the entire delay time direction $t_{delay}$. By rotating 700, a phase stability between the channel pulse responses can be advantageously improved, especially created, via the detection time direction $t_{time}$. Thus, an (unintentionally) occurring high dynamic component of the plurality of channel pulse responses with the respective in-phase data and the quadrature-phase data caused by technical tolerances or inaccuracies can be kept particularly advantageously low, preferably eliminated. Further, the method has as a step a detecting 800 of the change in the transmission channel system in a detection time direction $t_{time}$ based on a change in the in-phase data and/or on a change in the quadrature-phase data of the plurality of channel pulse responses rotated in each case at least within the limited viewing area of the delay time direction $t_{delay}$ of the plurality of channel pulse responses by means of a detection unit 80. In particular, the change in the transmission channel system in the detection time direction $t_{time}$ can be detected 810 at least by determining a change in a phase angle $\varphi$ of the plurality of respective rotated channel pulse responses at least within the limited viewing area of the delay time direction $t_{delay}$ of the plurality of channel pulse responses (see, e.g., FIG. 8), wherein the phase angle $\varphi$ is determined based on the in-phase data and the quadrature-phase data of the plurality of channel pulse responses rotated in each case. In particular, it is conceivable, in addition to or as an alternative to this, that the change in the transmission channel system in the detection time direction $t_{time}$ is detected 820 at least by determining a change in the amplitude of the in-phase data of the plurality of channel pulse responses rotated in each case, at least within the limited viewing area of the delay time direction $t_{delay}$ of the plurality of channel pulse responses and/or that in addition or alternatively to this, the change in the transmission channel system in the detection time direction $t_{time}$ can be detected 830 at least by determining a change in an amplitude of the quadrature-phase data of the plurality of channel pulse responses rotated in each case at least within the limited viewing area of the delay time direction $t_{delay}$ of the plurality of channel pulse responses. Furthermore, for detecting 800, 810, 820, 830 the change in the transmission channel system in the detection time direction $t_{time}$, the plurality of channel pulse responses can optionally be filtered 790 with the in-phase data and quadrature-phase data in the detection time direction $t_{time}$ by means of a filter unit 79 at least in the limited viewing area of the delay time direction $t_{delay}$ of the plurality of channel pulse responses.

Figure 2:
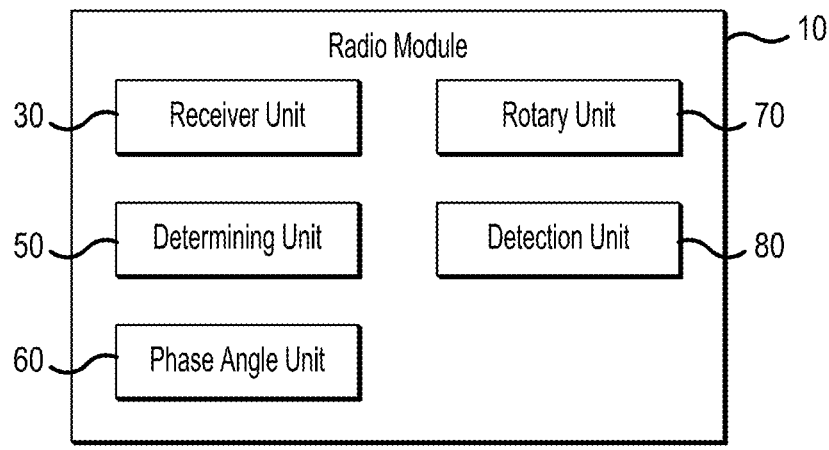
FIG. 2 shows a radio module.

FIG. 2 reveals a radio module 10 for a radio system 1 for detecting a change in a transmission channel system of a vehicle 100 with at least one transmission channel. The radio module 10 comprises at least one receiver unit 30 for receiving at least one receive signal based on the broadband transmission signal and at least one determining unit 50 for determining in-phase data and quadrature-phase data of a channel pulse response of the at least one transmission channel of the vehicle 100 based on the receive signal. In addition, the radio module 10 comprises at least one phase angle unit 60 for determining an actual phase angle $\varphi_{i,ist}$ of the channel pulse response in at least one characteristic location C1, C2 of a plurality of channel pulse responses based on the determined in-phase data and quadrature-phase data of the channel pulse response of the plurality of channel pulse responses, as well as for determining a phase rotation angle $\varphi_{i,Drehen}$ of the channel pulse response from the actual phase angle $\varphi_{i,ist}$ of the channel pulse response and a fixed, definable target phase angle $\varphi_{Soll}$ of the plurality of channel pulse responses. In addition, the radio module 10 comprises at least one rotary unit 70 for a rotation 700 of the channel pulse response with the determined in-phase data and quadrature-phase data at least in a limited viewing area A2, A3 of a delay time direction $t_{delay}$ of the plurality of channel pulse responses by the determined phase rotation angle $\varphi_{i,Drehen}$. Furthermore, the radio module 10 comprises at least one detection unit 80 for detecting the change in the transmission channel system in a detection time direction $t_{time}$ based on a change in the in-phase data and/or on a change in the quadrature-phase data of the plurality of channel pulse responses rotated at least in the limited viewing area A2, A3 of the delay time direction $t_{delay}$ of the plurality of channel pulse responses in the detection time direction $t_{time}$.

Figure 3:
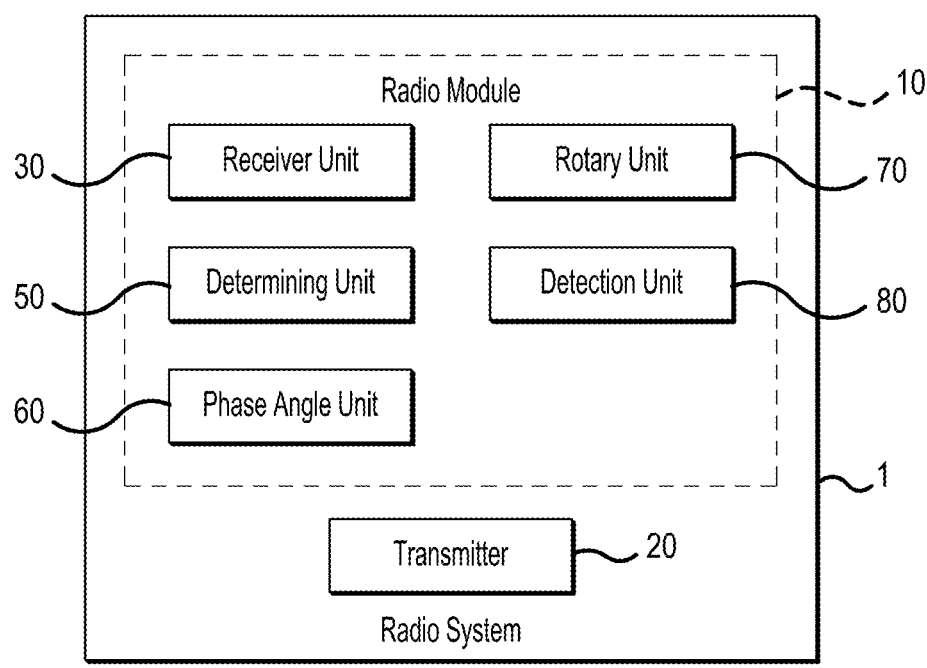
FIG. 3 shows a radio system.

FIG. 3 reveals a radio system 1, wherein the radio system 1 includes a radio module 10 (cf., e.g., FIG. 2) with a receiver unit 30, a determining unit 50, a phase angle unit 60, a rotary unit 70 and a detection unit 80 as well as a transmitter unit 20 for transmitting a broadband transmission signal over a transmission channel system.

Figure 4:
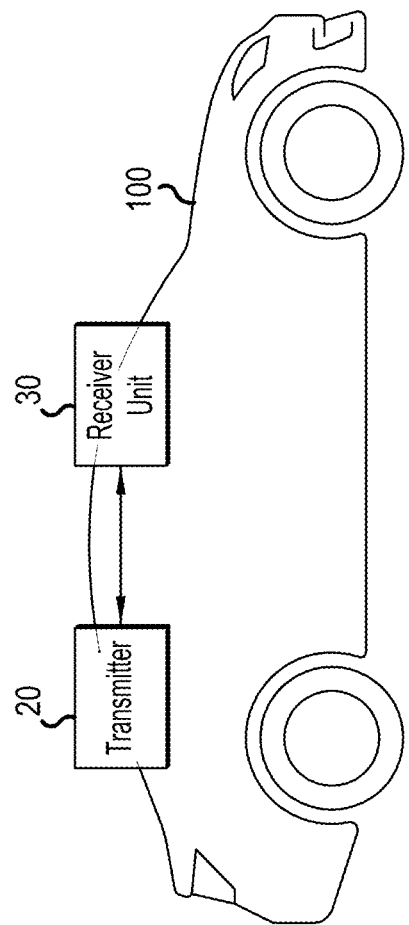
FIG. 4 shows a vehicle.

FIG. 4 reveals a vehicle 100 with a radio system 1 as it has been described for, e.g., FIG. 3, wherein the transmitter unit 20 of the radio system 1 and the receiver unit 30 of the radio system 1 are arranged in an interior of the vehicle 100 on and/or in a vehicle roof of the vehicle 100 separated from each other, in particular in a fixed position, in such a way that the transmitter unit 20 and the receiver unit 30 in the interior of vehicle 100 have the geometrically shortest line of sight to each other.

Figure 5:
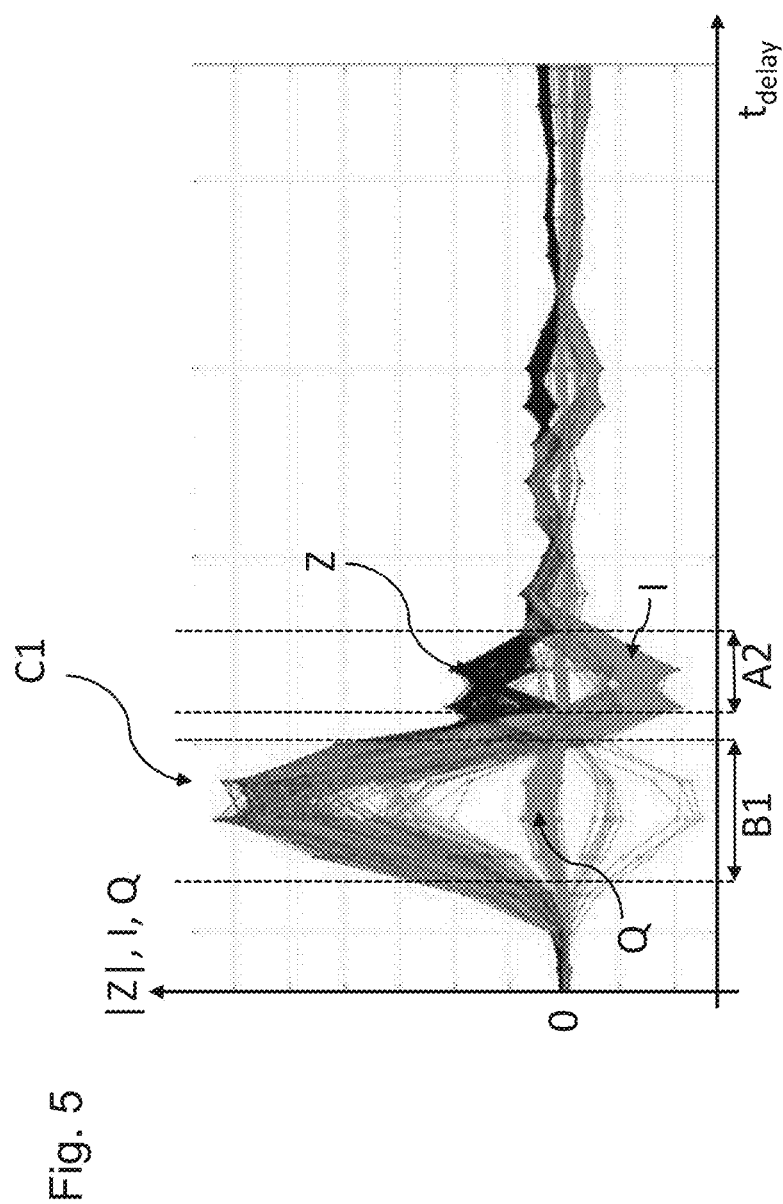
FIGS. 5, 6 show a progression of the in-phase values, a progression of the quadrature-phase values as well as a progression of the amount values in the delay time direction
Figure 6:
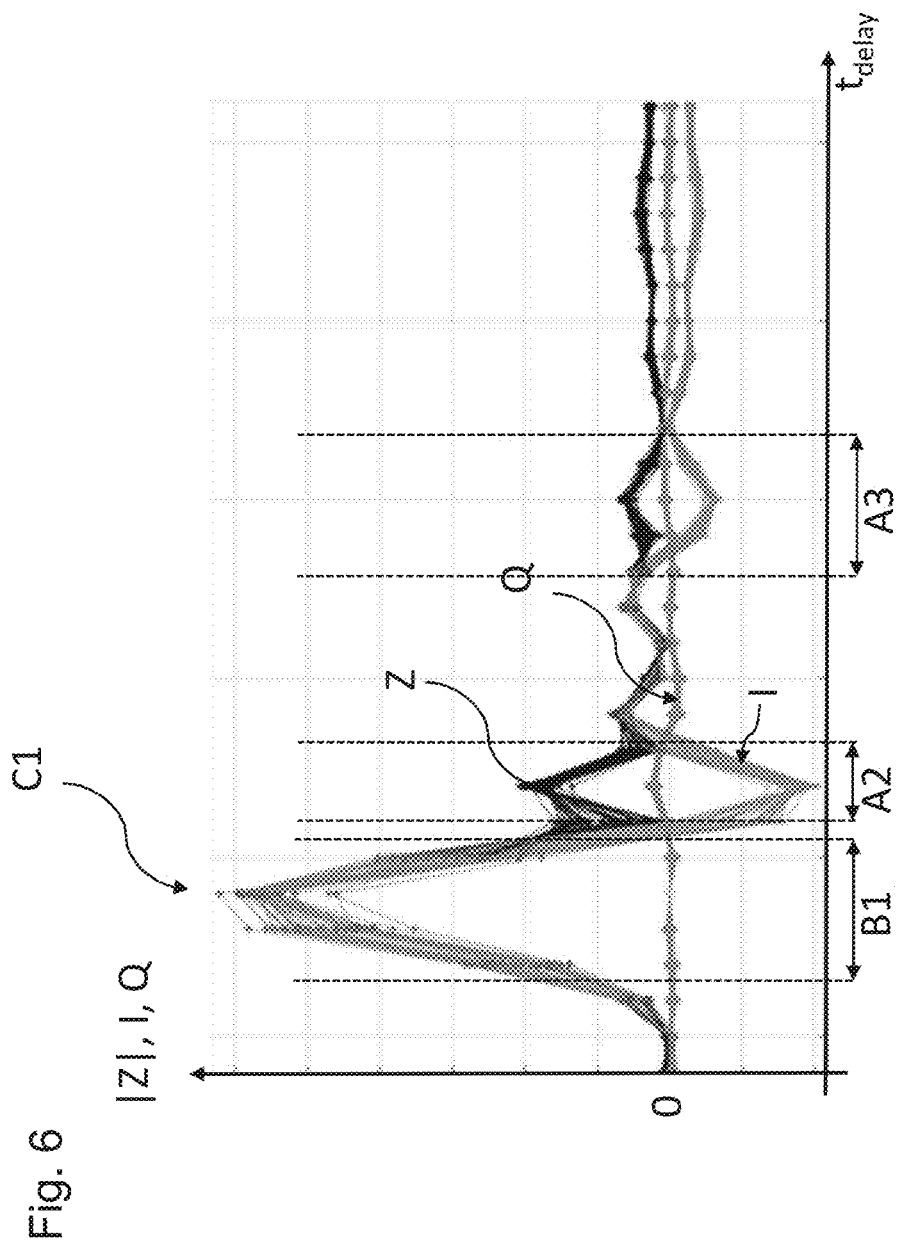

FIG. 5 shows an example of a respective curve of the in-phase values I, a respective curve of the quadrature-phase values Q as well as a respective curve of the amount values Z obtained from the in-phase data and the quadrature-phase data of a plurality of channel pulse responses in a delay time direction $t_{delay}$, wherein the plurality of channel pulse responses with the determined in-phase data and quadrature-phase data have not yet been rotated by a respective determined phase rotation angle $\varphi_{i,Drehen}$. It can be seen from FIG. 5 that there is no phase stability between the plurality of channel pulse responses determined in the detection direction, although no change has been made in the transmission channel system or the transmission channel of the transmission channel system for the plurality of channel pulse responses in the detection time direction ("over time"). Detecting a "real" change in the transmission channel system of the vehicle 100 is difficult, especially impossible, due to the phase instability between the channel pulse responses. With a method such as described, e.g., in FIG. 1, in a characteristic location C1 of the plurality of channel pulse responses, an actual phase angle $\varphi_{i,ist}$ of the plurality of channel pulse responses is determined based on the determined in-phase data and quadrature-phase data of the respective channel pulse response of the plurality of channel pulse responses. On the basis of the respective determined actual phase angle $\varphi_{i,ist}$ of the plurality of channel pulse responses and a fixed, definable target phase angle $\varphi_{Soll}$, e.g., 0°, of the plurality of channel pulse responses, a respective phase rotation angle $\varphi_{i,Drehen}$ is determined for each channel pulse response of the plurality of channel pulse responses. The characteristic location C1 in FIG. 5 represents the "line of sight" of the transmission channel of the transmission channel system. In particular, the "line of sight" of the transmission channel forms a first amplitude maximum in time of the plurality of channel pulse responses as well as at the same time a respective local amplitude maximum of the plurality of channel pulse responses as well as at the same time the respective absolute amplitude maximum of the plurality of channel pulse responses. In this example in particular, the "line of sight" of the transmission channel has a particularly high information content and is therefore particularly advantageously suited as the characteristic location or the characteristic viewing area B1 from which the characteristic location can be determined. Due to the fact that the quadrature-phase values Q in the characteristic viewing area B1 have almost the value 0 (zero), the course of the in-phase values I and the course of the amount values Z in the characteristic viewing area B1 overlap. As can be seen from FIG. 6, by rotating the plurality of channel pulse responses with the determined in-phase data and quadrature-phase data by the respective determined phase rotation angle $\varphi_{i,Drehen}$, the dynamic component between the plurality of determined in-phase data of the plurality of channel pulse responses and the dynamic component between the plurality of determined quadrature-phase data of the plurality of channel pulse responses can be particularly advantageously reduced, in particular eliminated in each case. As shown in FIG. 8, the change in the transmission channel system in the detection time direction $t_{time}$ can be detected at least by determining a change in a phase angle $\varphi$ of the plurality of channel pulse responses rotated in each case.

Figure 7:
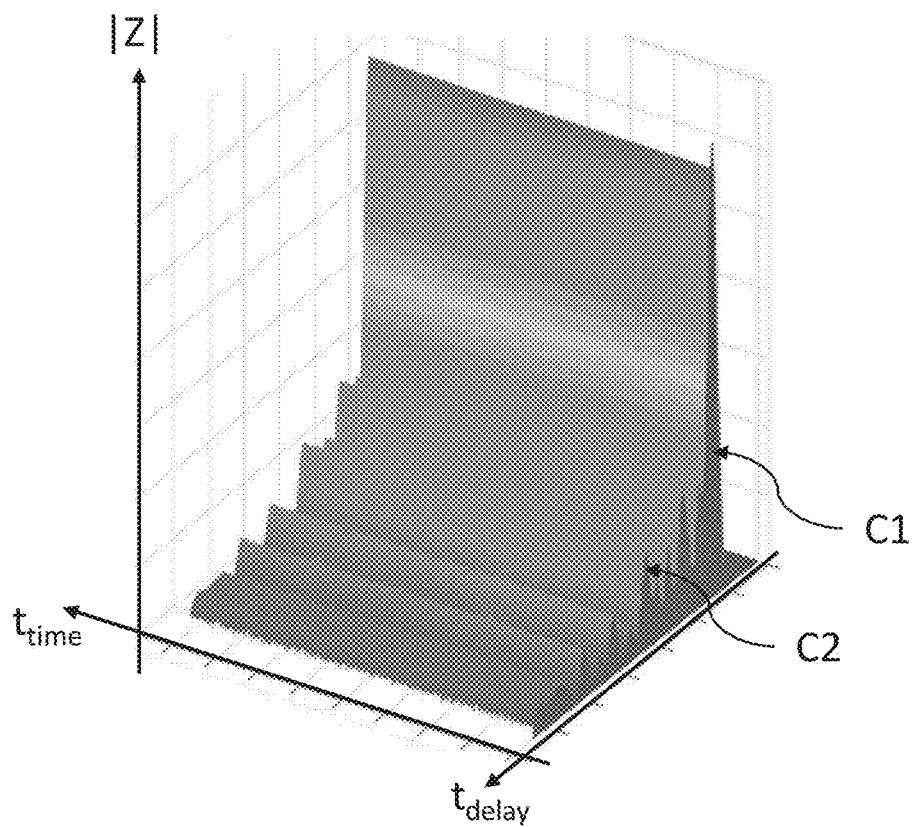
FIG. 7 shows a plurality of channel pulse responses.

FIG. 7 shows an example of a respective curve of the amount values Z obtained from the in-phase data and the quadrature-phase data of a plurality of channel pulse responses in a delay time direction $t_{delay}$ over a detection time direction $t_{time}$. As can be seen from FIG. 7, the channel pulse responses in a delay time direction $t_{delay}$ can each comprise several characteristic locations C1, C2. The characteristic location C1 represents in particular the "line of sight" and the characteristic location C2 represents in particular a reflection path. The "line of sight" as a characteristic location is particularly advantageous for determining a respective actual phase angle $\varphi_{i,ist}$ of the plurality of channel pulse responses.

FIG. 8 shows the curve of a phase angle $\varphi$ based on the channel pulse responses rotated in each case with the "rotated" in-phase data and the "rotated" quadrature-phase data for a first delay time $t_{delay,1}$ and for a second delay time $t_{delay,2}$ of the delay time direction $t_{delay}$, wherein a change in a transmission channel of the vehicle 100 took place three times (3×) in the detection time direction. These changes in the transmission channel of the vehicle 100 are clearly visible as deflections in the course of the phase angle $\varphi$. Detecting the change in the transmission channel of the vehicle 100 can be used, e.g., to monitor the vehicle 100. Furthermore, in order to detect the change in the transmission channel system in the detection time direction $t_{time}$, the course of the phase angle $\varphi$ of the plurality of channel pulse responses can be filtered by means of a filter unit 79. In particular, it is also conceivable that a comparison with a threshold value is made.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for detecting a change in a transmission channel system of a vehicle with at least one transmission channel, the method comprising:
   transmitting a broadband transmission signal via a transmitter unit over the transmission channel system;
   receiving at least one receive signal based on the broadband transmission signal via a receiver unit;
   determining in-phase data and quadrature-phase data of at least one channel pulse response of the at least one transmission channel based on the receive signal via a determinator;
   repeating the steps of transmitting, receiving, and determining to determine a respective in-phase data and quadrature-phase data of at least a plurality of channel pulse responses of the at least one transmission channel;
   determining a respective actual phase angle of the plurality of channel pulse responses in at least one characteristic location of the plurality of channel pulse responses based on the determined in-phase data and quadrature-phase data of the respective channel pulse response of the plurality of channel pulse responses by a phase angle unit;
   determining a respective phase rotation angle of the plurality of channel pulse responses from the respective actual phase angle of the plurality of channel pulse responses and a fixed, definable target phase angle of the plurality of channel pulse responses by the phase angle unit;
   respectively rotating the plurality of channel pulse responses with the determined in-phase data and quadrature-phase data at least within a limited viewing area of a delay time direction of the plurality of channel pulse responses by the respective determined phase rotation angle by a rotator;
   detecting the change in the transmission channel system in a detection time direction based on a change in the in-phase data and/or a change in the quadrature-phase data of the plurality of channel pulse responses rotated in each case at least within the limited viewing area of the delay time direction of the plurality of channel pulse responses by a detector.

2. The method according to claim 1, wherein the respective phase rotation angle of the plurality of channel pulse responses is determined as the negative difference or essentially the negative difference from the respective actual phase angle of the plurality of channel pulse responses and the fixed, definable target phase angle.

3. The method according to claim 1, wherein the change in the transmission channel system in the detection time direction is detected at least by determining a change in a phase angle of the plurality of respective, rotated channel pulse responses at least within the limited viewing area of the delay time direction of the plurality of channel pulse responses, and wherein the phase angle is determined on the basis of the in-phase data and the quadrature-phase data of the plurality of respective, rotated channel pulse responses.

4. The method according to claim 1, wherein the change in the transmission channel system in the detection time direction is at least detected by determining a change in the amplitude of the in-phase data of the plurality of rotated channel pulse responses at least in the limited viewing area of the delay time direction of the plurality of channel pulse responses and/or wherein the change in the transmission channel system in the detection time direction is detected at least by determining a change in the amplitude of the quadrature-phase data of the plurality of respective, rotated channel pulse responses at least in the limited viewing area of the delay time direction of the plurality of channel pulse responses.

5. The method according to claim 1, wherein for the detection of the change in the transmission channel system in the detection time direction, the plurality of respective, rotated channel pulse responses with the in-phase data and quadrature-phase data in the detection time direction is to be filtered by a filter unit at least in the limited viewing area of the delay time direction of the plurality of channel pulse responses.

6. The method according to claim 1, wherein the at least one characteristic location of the plurality of channel pulse responses is a location in a characteristic viewing area of the delay time direction around a first amplitude maximum in time of the plurality of channel pulse responses.

7. The method according to claim 1, wherein the at least one characteristic point of the plurality of channel pulse responses is a point in a characteristic viewing area of the delay time direction around a respective local amplitude maximum of the plurality of channel pulse responses.

8. The method according to claim 1, wherein the at least one characteristic point of the plurality of channel pulse responses is a point in a characteristic viewing area of the delay time direction around a respective absolute amplitude maximum of the plurality of channel pulse responses.

9. The method according to claim 1, wherein for the detection of the change in the transmission channel system in the detection time direction, the plurality of channel pulse responses with the respective determined in-phase data and quadrature-phase data in several limited viewing areas of the delay time direction of the plurality of channel pulse responses is rotated by the respective determined phase rotation angle.

10. A radio system to detect a change in a transmission channel system of a vehicle with at least one transmission channel, wherein the radio system is designed to perform the method according to claim 1.

11. The radio system according to claim 10, wherein the radio system comprises:
 at least one radio module; and
 at least one transmitter unit for transmitting a broadband transmission signal over a transmission channel system.

12. A vehicle with a radio system according to claim 10, wherein at least one transmitter) of the radio system for transmitting a broadband transmission signal and at least one receiver of the radio system for receiving at least one receive signal based on the broadband transmission signal are arranged on and/or in the vehicle separately from each other, or are arranged separately from each other in a fixed position, and wherein the at least one transmitter unit and the at least one receiver unit have a geometrically shortest line of sight to each other.

13. A radio module for a radio system for detecting a change in a transmission channel system of a vehicle with at least one transmission channel, the radio module comprising:
 at least one receiver to receive at least one receive signal based on the broadband transmission signal;
 at least one determinator to determine in-phase data and quadrature-phase data of a channel pulse response of at least one transmission channel of the vehicle based on the receive signal;
 at least one phase angle unit to determine an actual phase angle of the channel pulse response in at least one characteristic location of a plurality of channel pulse responses based on the determined in-phase data and quadrature-phase data of the channel pulse response of the plurality of channel pulse responses, and to determine a phase rotation angle of the channel pulse response from the actual phase angle of the channel pulse response and a fixed, definable target phase angle of the plurality of channel pulse responses;
 at least one rotator to rotate the channel pulse response with the determined in-phase data and quadrature-phase data at least within a limited viewing area of a delay time direction of the plurality of channel pulse responses by the determined phase rotation angle;
 at least one detector to detect the change in the transmission channel system in a detection time direction based on a change in the in-phase data and/or on a change in the quadrature-phase data of the plurality of channel pulse responses rotated in the detection time direction at least in the limited viewing area of the delay time direction of the plurality of channel pulse responses.

\* \* \* \* \*